Nov. 6, 1956
R. A. GORDON
2,769,740
NYLON TRIMMING WITH A SECURING MEMBER THEREON
IMPREGNATED WITH A POLYVINYL RESIN
COUPLED TO AN ACID RADICAL
Filed Nov. 9, 1953
2 Sheets-Sheet 1
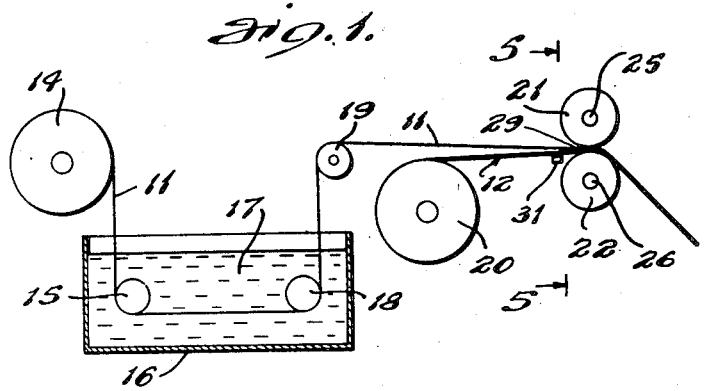
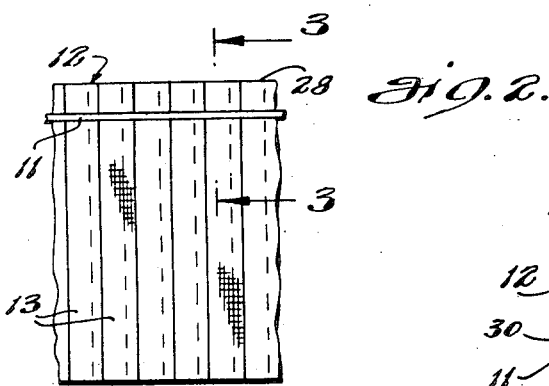
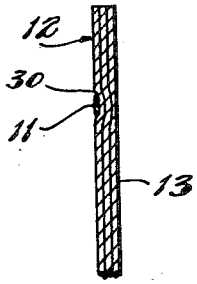
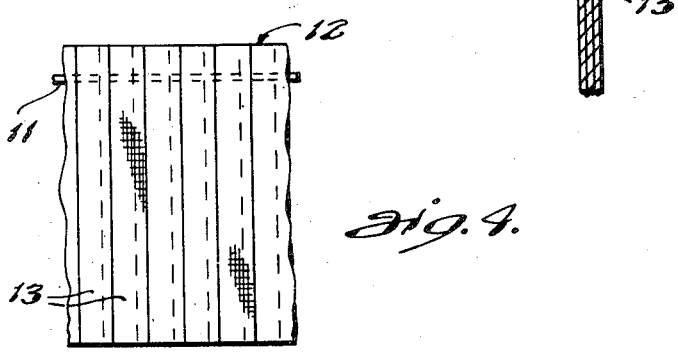
INVENTOR.
Richard A. Gordon
BY J. Walter Boden
ATTORNEY United States Patent Office 2,769,740
Patented Nov. 6, 1956

2,769,740

NYLON TRIMMING WITH A SECURING MEMBER THEREON IMPREGNATED WITH A POLYVINYL RESIN COUPLED TO AN ACID RADICAL

Richard A. Gordon, Brooklyn, N. Y.

Application November 9, 1953, Serial No. 391,108

2 Claims. (Cl. 154—46)

This invention relates to a thermoplastic resin impregnated securing member for trimming, the trimming made with the novel securing member, and the method of making it.

The invention relates to my experiments in this field in my attempts to produce a trimming in which the pleats thereof would be held to one another by a securing member without the use of conventional adhesives. It is well known in this art that the use of adhesives of conventional type for this purpose is unsatisfactory since the adhesive is of a different density from that of the fabric of which the trimming is formed and thereby "spots" the trimming in the region of the securing member. Such trimming can then no longer be used for filmy negligee and the like.

I have previously discovered that the fabric itself can be made to act as its own adhesive by impregnating the securing member with an agent adapted to swell the fabric, applying the securing member to the fabric so that the fabric swells at the points at which the securing member impinges upon the fabric, and then causing the fabric to contract by the application of heat and pressure so that the securing member is firmly bonded to the fabric. This method has been fully described in my copending application Serial Number 348,476 filed April 13, 1953, now United States Patent Number 2,662,577.

The method described in the above-mentioned United States Patent is satisfactory and a large quantity of trimming has been made using this method with good commercial success. The success of this process, however, caused me to continue my experiments to discover an even superior method.

The method using a swelling agent as described in my prior patent is perfectly satisfactory in the hands of a skilled and careful operator. However should the operator be careless and splash some of the swelling agent upon the fabric or run the securing member through the bath of swelling agent at too rapid a rate the fabric will be ruined since the swelling agent will be applied to portions of the fabric upon which swelling is not desired.

My review of the prior art indicated that prior attempts had been made to hold securing members to fabrics made of thermoplastic materials by coating the securing member with the thermoplastic material of which the fabric was made, applying the securing member to the fabric and thence applying heat at a temperature above the melting point of the fabric so that heat sealing took place between the material coating the securing member and the material of the fabric.

This prior method was unsatisfactory for my purpose since the fabric was partially melted by the application of such high temperatures so that the method could not be used for trimming. However I discovered that if I coated the securing member with a thermoplastic resin of lower melting point than that of the material composing the fabric, and then applied heat and pressure using a temperature above the melting point of the resin coating the securing member but below the melting point of the material composing the fabric the securing member could be firmly held to the fabric. If there were added to the material used for coating the fabric a small amount of a fabric swelling agent a still better bond would be produced.

The invention will be further described by reference to the accompanying drawings which are made a part of this specification.

Fig. 1 is a diagrammatic view of the method of this invention where either an unpleated fabric is used or the fabric has been pleated prior to its entry into the method.

Fig. 2 is a front view of the trimming produced by this invention showing the securing member in position upon the trimming.

Fig. 3 is a sectional view of the trimming produced by this invention taken along lines 3—3 of Fig. 2.

Fig. 4 is a rear view of the trimming produced by this invention.

Figure 5:
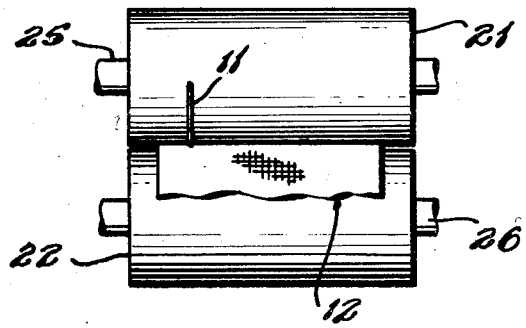
Fig. 5 is a sectional view of the apparatus shown in Fig. 1.

Referring now to the specific embodiment of the method of this invention as shown in Figs. 1, 2, 3, 4, and 5 there is shown a swellable fabric 12 which is made of nylon, rayon, or other thermoplastic resin material. The fabric is generally netted.

Fabric 12, which forms the trimming of this invention, is formed with a plurality of pleats, which are preferably vertical. The term "vertical," as used in this specification, is defined to mean a direction at an angle to the longest dimension of the fabric. Securing member 11 holds the edge portions of pleats 13 of fabric 12 to one another. Securing member 11 is disposed within recess 30 of fabric 12.

The method of this invention will now be described wherein a thermoplastic resin of lower melting point than the material composing the trimming is used and a swelling agent is not used. Referring to Figs. 1–5 of the drawings the fabric is fed from roll 20 and the securing member 11 is fed from roll 14. Fabric 12 may be either pleated to unpleated, and, if pleated, has been so formed prior to its disposition upon roll 20.

Securing member 11, preferably a cotton thread, is fed from roll 14 into tank 16 where it passes over rollers 15 and 18. Tank 16 is filled with a liquid thermoplastic resin, preferably a water dispersion of polyvinyl chloride or other polyvinyl resin coupled to an acid radical. This material, that is the polyvinyl chloride or other polyvinyl resin coupled to an acid radical, has a lower melting point than that of the thermoplastic resin of which the fabric composing the trimming is made.

As securing member 11 passes through tank 16 a quantity of the liquid resin adheres to it. Securing member 11 is then led over roller 19 and strikes fabric 12 just prior to the passage of fabric 12 between rollers 21 and 22. The point at which securing member 11 strikes fabric 12 is indicated in Fig. 1 at 29.

Fabric 12 then passes over holding member 31 which assures the proper angle of approach and then both fabric 12 and securing member 11 pass together between rollers 21 and 22 which turn upon shafts 25 and 26. Rollers 21 and 22 are heated, preferably by electrical means, and the temperature of the rollers are controlled by conventional thermostatic means which cut off the supply of power to the elements heating the rollers when the temperature of the rollers becomes too high. The temperatures used are as high as possible and must be above the melting point of the thermoplastic resin used to coat the securing member 11. However the temperatures must also be below the melting point of the fabric forming the trimming. With most fabrics the temperature will range from 200°–500° Fahrenheit and where nylon fabric is used the temperature ranges from 350°–385° Fahrenheit.

The passage of fabric 12 and securing member 11 through rollers 21 and 22 applies heat and pressure simultaneously to the fabric. The heat melts the thermoplastic resin coating of securing member 11 and the pressure forces securing member 11 against fabric 12. After the heat is removed the thermoplastic resin coating securing member 11 hardens and, since some of the resin has flowed onto fabric 12, a firm bond between securing member 11 and fabric 12 has been formed. Furthermore, since a water dispersion of the resin is used, the securing member 11 will not stick to rollers 21 and 22 when securing member 11 is applied to fabric 12 since the water acts as an insulating agent.

In the preferred modification of this invention as shown in the drawings the angle of approach of securing member 11 to fabric 12 is so chosen that securing member 11 is disposed upon fabric 12 in a longitudinal direction and is spaced from the upper transverse extremity of fabric 12 as indicated in Fig. 2 and Fig. 4 at 28. The term "longitudinal direction," as used in this specification is defined to mean a substantially horizontal direction along the length of the fabric, the length being the longest dimension thereof.

Figure 6:
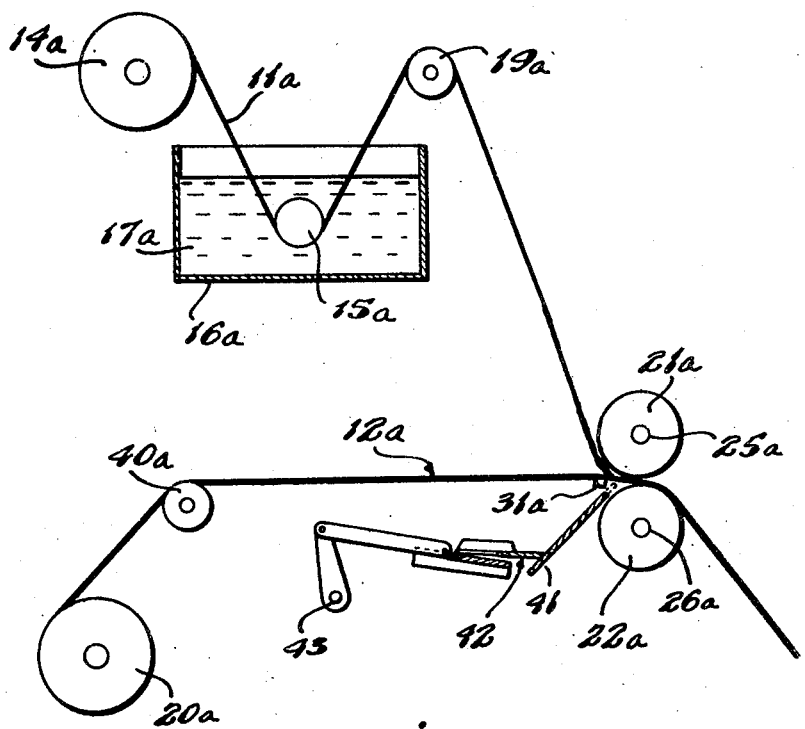
Fig. 6 is a diagrammatic view of the method of this invention where the fabric forming the trimming is pleated at the time that the securing member is disposed upon it.

Fig. 6 shows a method which may be employed to apply this invention to a situation where the fabric is pleated at the same time that the securing member is applied to it. In this modification, also, the securing member is coated with a thermoplastic resin and an agent adapted to swell the fabric. In this modification securing member 11a is fed from roll 14a into tank 16a. Tank 16a is filled with a thermoplastic resin in liquid form whose melting point is below that of the material composing fabric 12 and also a small quantity of an agent adapted to swell fabric 12. The preferred material for this purpose is a water dispersion of polyvinyl chloride which is known under the trademark "Geon" for the thermoplastic resin, and a solution of 4% benzoic acid in water for the swelling agent. This material is preferably mixed in the proportion of 90% polyvinyl chloride solution to 10% benzoic acid solution.

The securing member 11 passes over roller 15a in tank 16a causing a quantity of the material contained in tank 16a to adhere to securing member 11a. Securing member 11a is then carried over roller 19a and is caused to strike fabric 12a at a point just ahead of rollers 21a and 22a.

At the same time fabric 12a is fed from roll 20a over roller 40a and over holding member 31a to the junction point with securing member 11a. Pleating blade 41 is adapted to move upwardly by the reciprocating movement of arm 42 about pivot 43. This movement is indicated by the phantom lines above blade 41. As blade 41 moves upwardly it creases fabric 12a and causes it to come in contact with securing member 11a. As securing member 11a strikes fabric 12a it lies across the edge portions of the pleats of fabric 12a. When fabric 12a and securing member 11a are then led between rollers 21a and 22a which turn upon shafts 25a and 26a, the rollers being heated and capable of applying pressure, the thermoplastic resin coating securing member 11a is melted. At the same time the swelling agent coating securing member 11a has swelled the fabric and the heat which is now applied tends to contract the swollen portion of the fabric. After the heat and pressure are removed, therefore, the thermoplastic resin causes a firm bond between the securing member and the fabric while the swelling agent has caused the formation of a recess in the fabric about the securing member and subsequent contraction of the recess because of the subsequent contraction of the fabric. There has, therefore, been a formation of a novel structure.

The foregoing specific embodiments of this invention as set forth in the accompanying specification and drawings are for illustrative purposes and for purposes of example only. Various changes and modifications may obviously be made within the spirit and scope of the invention and would occur to those skilled in this art.

I claim:

1. A nylon trimming formed with a plurality of pleats, a securing member disposed across the edge portions of said pleats securing said pleats to one another, said securing member being impregnated with a water dispersion of polyvinyl chloride.

2. A nylon trimming formed with a plurality of pleats, a securing member disposed across the edge portions of said pleats securing said pleats to one another, said securing member being impregnated with a water dispersion of a polyvinyl resin coupled to an acid radical which has a lower melting point than the nylon forming the trimming.

References Cited in the file of this patent

UNITED STATES PATENTS

| | | |
|---|---|---|
| 2,107,748 | Cohn | Feb. 8, 1938 |
| 2,144,513 | Smith | Jan. 17, 1939 |
| 2,224,149 | Fisher | Dec. 10, 1940 |
| 2,342,231 | Whitehead | Feb. 22, 1944 |
| 2,392,805 | Biefeld | Jan. 15, 1946 |
| 2,467,340 | Seymour | Apr. 12, 1949 |
| 2,487,448 | Kingerley | Nov. 8, 1949 |
| 2,531,571 | Hyde | Nov. 28, 1950 |
| 2,555,409 | Hosfield | June 5, 1951 |
| 2,565,219 | Gardiner et al. | Aug. 21, 1951 |
| 2,578,664 | Beery et al. | Dec. 18, 1951 |
| 2,593,090 | Bartosz | Apr. 15, 1952 |
| 2,640,796 | Langer | June 2, 1953 |